(No Model.) 2 Sheets—Sheet 2.
J. DILLON.
CONNECTION FOR ELECTRIC CONDUCTORS.
No. 457,761. Patented Aug. 11, 1891.
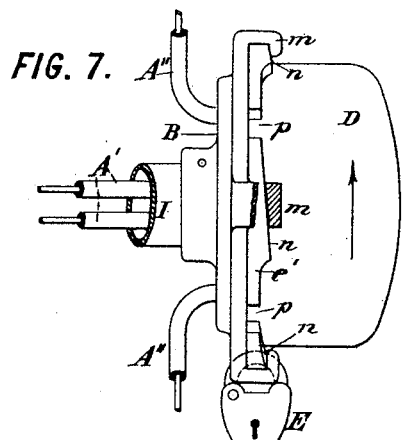
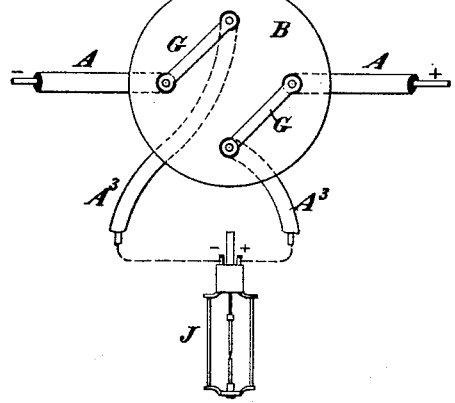
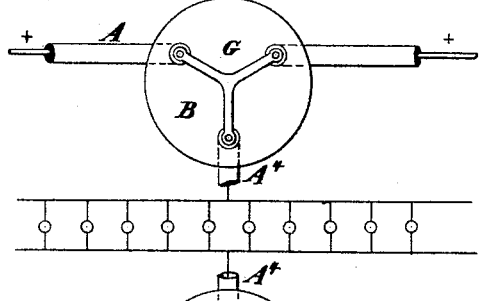
WITNESSES:
John Becker
C. K. Fraser.
INVENTOR:
Joseph Dillon,
By his Attorneys,
Arthur G. Fraser & Co.

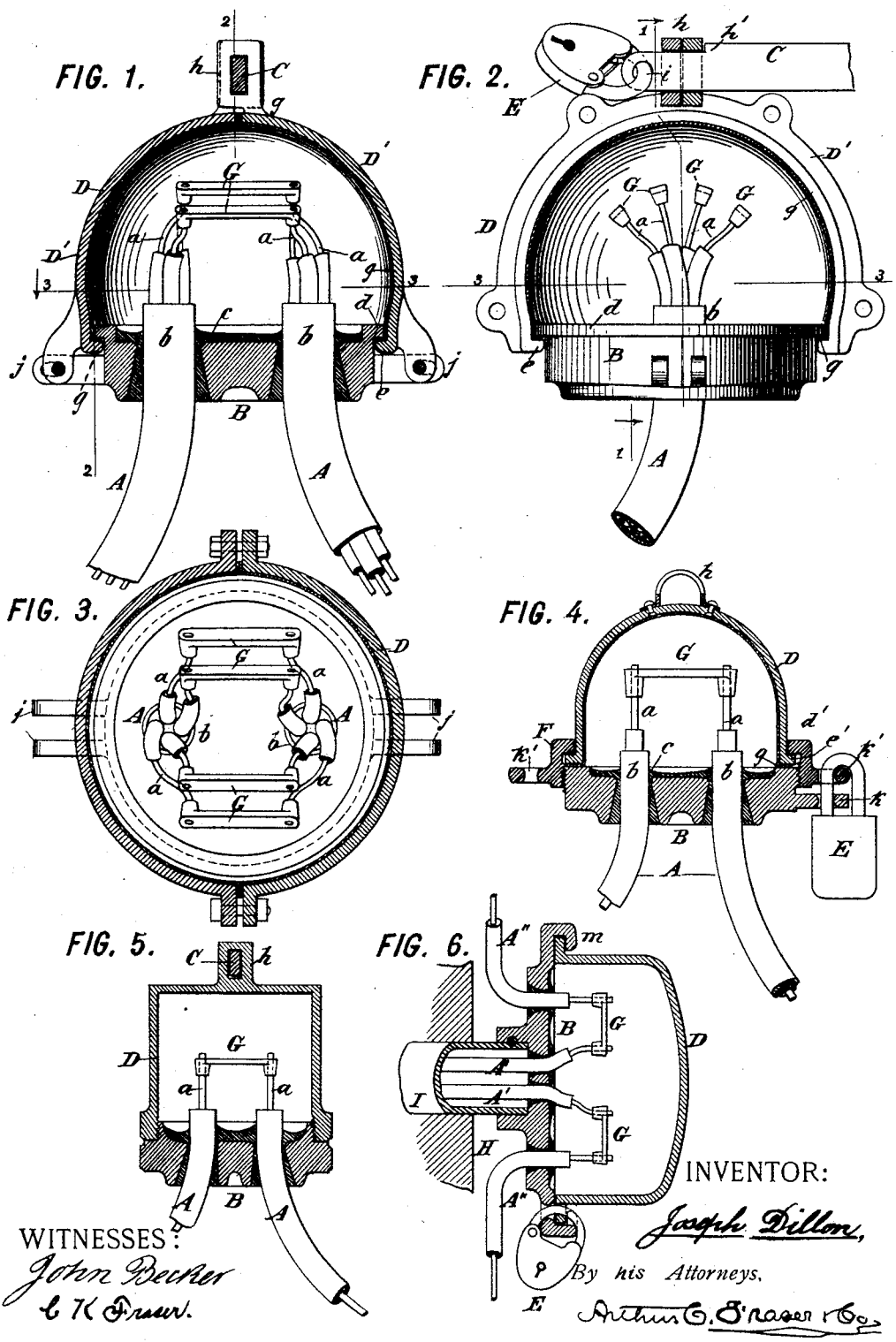

UNITED STATES PATENT OFFICE.

JOSEPH DILLON, OF LARCHMONT, ASSIGNOR OF ONE-HALF TO H. J. REILLY, OF NEW YORK, N. Y.

CONNECTION FOR ELECTRIC CONDUCTORS.

SPECIFICATION forming part of Letters Patent No. 457,761, dated August 11, 1891.

Application filed January 16, 1890. Serial No. 337,030. (No model.)

*To all whom it may concern:*

Be it known that I, JOSEPH DILLON, a citizen of the United States, residing in Larchmont, in the county of Westchester, State of New York, have invented certain new and useful Improvements in Connections for Electric Conductors, of which the following is a specification.

The objects of this invention are to facilitate the joining of electrical conductors to one another, to prevent the disarrangement of the joint by mechanical displacement of the parts, to preserve the joint from deterioration, to render it readily accessible by authorized persons, and to prevent tampering with or disarrangement of the wires by unauthorized persons.

The invention is applicable both to overhead and underground wires, but is intended more especially for use with the latter. In the case of underground conductors the joints are made in man-hole boxes arranged at intervals and connected by the underground conduits. In such conduits the wires of different electric companies are commonly laid together, each inclosed in a lead-covered or other cable, the joints between the successive lengths of cable being arranged in the man-hole boxes, where the ends of the cables are given sufficient slack to enable the joint to be carried to one side of the line of the conduit. Such joints as heretofore made are very expensive, are liable to be impaired by handling, and are difficult of access, it being necessary to partially destroy the joint in order to reach the joined ends of the wires.

It is an important object of my invention to provide a joint wherein the insulation of the wire or wires shall not be subjected to flexure at or close to the joint, in order thereby to avoid the liability of access of moisture to the joint with the resulting leakage from the conductors.

Another object is to render the joint more easy and quick of application, and hence less expensive.

A further object is to render the jointed wires readily accessible, and another object is to provide means for fastening the joint in place to prevent its being disarranged and to fasten it closed to prevent access to it by unauthorized persons.

To these ends my invention provides a case or shell for inclosing the joined ends of the conductors with parallel openings through which the ends of the cables or sheathed wires or groups of wires are thrust, and into which they are fastened in a manner both rigid to resist mechanical flexure and impermeable to air or moisture. The case or shell is constructed with a cap or cover, which can be applied and removed independently of the connection of the cable ends in said openings. The ends of the conductors within the case are bared of insulation and, being arranged parallel with each other, are electrically connected by applying to them a bridge-piece of copper or other conducting metal, the ends of which clasp the bared wires, and which are preferably soldered to them. The cover being applied, it is fastened by a padlock or any other locking device in such manner as to prevent the removal of the cover by an unauthorized person. The case or shell is also fastened in place within the man-hole box, in order that the connections may not be injured by shifting the joint from one position to another within the box. In practice I arrange the same padlock to serve both purposes.

Figures 1, 2, and 3 of the drawings show a construction embodying my complete invention, Figs. 1 and 2 being vertical sections in planes crossing each other perpendicularly, as denoted by the lines 1 1 and 2 2; and Fig. 3, a horizontal section on the line 3 3 in Figs. 1 and 2. Figs. 4, 5, and 6 are each diametrical sections answering to Fig. 1, and showing three separate modified constructions. Fig. 7 is a side elevation of the construction shown in Fig. 6. Figs. 8 and 9 are plan or face views, answering to Fig. 3, of two different modified constructions in connection with electric-circuit diagrams.

Referring to the drawings, A A designate electric conductors or connecting-cables suitably insulated on their exterior and containing one or more conducting-wires, according to any usual construction or arrangement. Where the ends of two such conductors or cables are to be joined together they are bared for a short distance of their external covering and the exposed wires are connected together by being twisted or soldered, or in any other way. According to my invention the ends of the cables are thrust through holes in a plate or piece of metal or other material B, which I term a "holder." In the construction shown in Figs. 1 to 5 this holder has two parallel holes of just sufficient size to admit the cables through them, and the ends of the cables thrust through these holes are fastened or held rigidly in invariable relative position through the medium of the holder B, so that the flexure of the main portion of the cables on one side of the holders may not be communicated to the ends of the cables protruding from the other. The separate insulated wires $a$ $a$, which are exposed by the removal of the outer covering $b$ of the cables, (this covering consisting usually of a lead tube, into which the wires are drawn,) are joined together by being bared of their individual insulations and having their denuded end portions soldered to a conducting-bridge G, as clearly shown in Figs. 1 and 4. In the case of lead-covered cables the holder B is preferably made of metal, and the ends of the cables thrust through it are fastened solidly to it in an air and water tight manner by soldering them, as denoted at $c$ $c$ in Figs. 1 and 4, the solder being applied readily by flooding the inner face of the holder, through which the lead-covered cables are passed.

The holder B constitutes part of an inclosing case or shell within which the joint is formed. This case or shell is designated by the letter D in the several figures. In one of its simplest forms the case consists of the base B, in the form of a disk, recessed on its inner face, as clearly shown, and a cover in the form of a cup having screw-threads engaging threads on the base, as shown in Fig. 5. The screw-joint between the cover and base should be air and water tight, so that when the cover is screwed home no moisture can gain access to the interior of the case. The cap or cover having been thus applied is fastened in such manner that it cannot be unscrewed by any unauthorized person. One construction for accomplishing this is shown in Fig. 4, where the cover is formed with a flange $e'$, which is drawn against the base B by the flange $d'$ on a coupling-ring F, which screws upon the exterior of the base. A padlock E has its hasp passed through an ear $k$ on the base and one or another of a succession of ears $k'$ on the ring, whichever one is in coincidence with the ear $k$.

The case D is locked or fastened in place within the man-hole to prevent its displacement therein and avoid any tampering with the wires or cables. To this end it is formed with means to engage a fixed support—as an eye $h$, adapted to be slipped over a bar C, as shown in Figs. 1, 2, or 5, whereupon it is fastened thereon by engaging a padlock with an eye formed in the end of the bar, as shown in Fig. 2. By adopting the construction shown in Fig. 5 this application of the padlock to the bar serves both to prevent displacement of the case and to prevent the opening of the case, since the case can only be opened by unscrewing its cap from the base, the rotation of the cap being prevented by the bar and the rotation of the base being prevented by the stiffness of the cables A A.

It will be observed that the ends of the wires or cables are held rigidly parallel with each other, or approximately so, the ends of the wires being denuded of insulation and left standing straight side by side, and are connected by the metal bridge G, the ends of which are made tubular to slip over and embrace the wires, to which they should be soldered to make a more perfect joint. By thus leaving the wires straight instead of twisting them together, as heretofore, the cracking of the insulation due to the bending of the wires is avoided. The cracking of the insulation is further prevented by the end of the sheathed wire or cable being held firmly and rigidly in the holder B, whereby any flexure of the cable on one side of the holder is prevented from being communicated to the portion of the wire or cable on the other side thereof.

Prior to my invention it has been customary to join the wires of successive lengths of underground cable by cutting away the lead sheath from the end portions of the two lengths, denuding the end portions of the inclosed wire or individual wires of their insulation, twisting together the ends of the corresponding wires in the two lengths of cable, wrapping the twisted joints separately with insulating-tape, and finally covering the entire group of joined wires with a casing of lead (usually a lead pipe previously slipped over one of the ends of the cable,) which is connected to the lead sheaths of the lengths of cable by wiped soldered joints. To get access to any wire of the cable, it was necessary to cut and destroy this lead casing. The moving of the several cables and their joints within the man-hole box from time to time, in order to get access to one or another of the cables, bends the cables adjacent to the soldered joints of the lead case, and frequently so far impairs these joints as to admit moisture through them, which causes a leakage or short-circuiting of the wires and frequently renders the cable useless. This construction of joint is superseded by my present invention, which provides equally well for protecting the conducting-wires from moisture, while affording greater security against the impairing of the joint by reason of flexure of the cables, and, in addition, leaving the joints easy of access and preventing access to them or disturbance of their position by unauthorized persons.

The special construction shown in Figs. 1, 2, and 3 is designed more particularly for cables inclosing two or more wires. In the drawings four wires $a\ a$ are shown. The inclosing case D is made of three parts, the disk-shaped holder or base B and two shells D' D' fitting together and embracing the base between them. The shells have flanges at the joints, through which bolts are passed to draw them together, and they are constructed with base-flanges $e$ to fit around the exterior of the base B and engage beneath the flange $d$ thereof, so that the holder is retained in place by the shells. In order to make the joints of the casing air and water tight, a lining or packing $g$ is provided, which comes between the several joints and causes them when the bolts are tightened to engage one another so intimately as to exclude air and moisture. The two shells D' D' are formed with eyes or hasps $h$, which, when the shells are drawn together, coincide and constitute a loop, which may be slipped over the end of the supporting-bar C and against a shoulder $h'$ thereon, while the padlock E is engaged with a hole $i$ in the end of the bar. This padlock thus serves to prevent the removal of the shell, and consequently, also, of the holder B, from the bar, and also to prevent the opening of the shell or casing. To prevent the separation of the parts of the casing, the shells D' D' are hinged to the holder B by hinges $j\ j$, the pintles of which work in slots extending toward and from the plane of union of the two shells, so that the latter may be slipped out along these hinges sufficiently to disengage their flanges $e$ from the flange $d$ before they are thrown open.

The individual wires $a\ a$ of each cable are bent apart radially, as shown in Fig. 2, so that each wire stands in a position corresponding to the continuation of the same wire in the other cable. The corresponding ends are then connected by applying the bridges G G. This slight bending of the wires, which occurs only once, has no injurious effect upon the insulation, such as the frequent bendings in different directions resulting from twisting the wires together would have.

Fig. 6 shows a construction especially designed for the wires leading into buildings from street-mains and the like. H designates the wall of the building or of the cellar thereof, and I a metal pipe, which may be of wrought-iron, which is carried through the wall and through which the wires A' A' pass. On the projecting inner end of this pipe, which thus becomes a fixed support for the holder and the cover, is fastened the base or holder B of the connection-case, having two holes for admitting the two wires A' and having also two other holes for admitting the wires A'' A''. Each of the wires A' is connected to one of the wires A'' by a copper bridge G of the same construction as that shown in Fig. 5. The wires A'' lead to the electric lighting or other fixtures of the building. The cover of the case D is fastened to the base or holder B in this construction by means of hooked fingers $m\ m$, projecting at intervals from the base B and engaging inclines $n\ n$ on the flange $e'$ of the cover D, as best shown in Fig. 7. This flange $e'$ is notched out at intervals, as shown at $p\ p$, to admit the passage of hooks $m\ m$ when the cover is applied against the base B. The cover is fastened tightly to the base by turning it in the direction of the arrow in Fig. 7, so that the inclines $n$, acting against the hooks $m$, force its flange tightly against the base or holder B. This movement brings two holes in the flange $e'$ and the rim of the base-plate B into coincidence, as shown in Fig. 6, after which the cover is locked to the fixed pipe I, through the medium of the holder B, in order to prevent rotation of the cover by introducing a padlock E through these holes.

My invention is applicable to various styles and arrangements of electrical connections—such, for example, as those required with electric-arc-lighting circuits, incandescent-lighting circuits in multiple arc, &c. Figs. 8 and 9 show two such applications.

Fig. 8 is a face view of the base B of such a construction as that shown—for example, in Fig. 5—having, however, four holes for the insertion of the wires or cables instead of two. A A are the two wires of the main line of an electric-arc-lighting circuit, and $A^3\ A^3$ are the wires of the loop extending to one or more lamps, one of which is shown diagrammatically at J. Each of the line-wires A A is connected by a bridge G to the end of one of the loop-wires $A^3$. By screwing on or otherwise attaching the cover of the case D, Fig. 5, the ends of the wires and their connecting-bridges G G are concealed and protected from moisture and from tampering.

Fig. 9 shows the application of my invention to incandescent-lighting circuits in multiple arc. A and A' are respectively the positive and negative line-wires, which are cut, and have their cut ends passed through two of the three holes in the respective holders B B. The third hole in each holder is entered by the end of a wire $A^4$, which wires constitute the branches leading to the subscriber, and between which the incandescent lamps are installed in the usual manner, as indicated by the diagram.

The provision of means whereby the box is fastened in position by the cover rather than by the holder secures a very desirable result in the use of the device and at a lower cost of manufacture. Not only is the whole device supported thereby, leaving the holder free to be moved as desired while securing the conductors therein, but by the same means the accidental loosening of the cover is prevented. Even a screw-joint, which is the cheapest and most convenient joint, will sometimes work loose sufficiently to admit water unless it be locked; but when the cover of my device, after its application to the holder, is engaged with the fixed support, it is effectually held against accidental loosening. Thus no locking bolts or nuts are required, as there would be were the device fastened by the holder.

The construction of the holder as a disk recessed on its inner face, as clearly shown in Figs. 1, 4, and 5, offers certain advantages which contribute materially toward making my improved connection a practical and desirable device. Heretofore in devices of a similar character the holder has been formed with extended nipples, into which the cable denuded of its lead covering has been inserted and the joint between the nipple and the lead covering subsequently formed by wiping. This demands the services of an experienced plumber, while in the application of my device no such skilled labor is necessary. The cables being extended through the apertures with their lead covering, they are at once securely fastened in position with an impermeable joint simply by flooding the recess on the inner face of the holder with melted lead or solder. A further advantage of this mode of securing the cables to the holder over that just referred to becomes very apparent whenever it is necessary for any cause to remove the cable from the holder. When the joint between the cable-covering and the nipple of the holder is formed by wiping, the cable cannot be separated from the holder without losing all that portion of the cable from the joint to the extremity, as a wiped joint cannot be repaired after severing without melting off the old lead and with it the covering of the cable, while the melting of the lead or solder necessary to release the cable from my holder will destroy, at most, no more than the length of covering above the inner face of the holder itself. Furthermore, the ends of the cables being held rigidly in and projecting from a substantially flat body can be more conveniently operated upon than if they projected somewhat loosely from the bottom of a deep cup. Again, if it is desired to surround the splice with a body of insulating material—such as paraffine—it may be accomplished readily by placing a collar of paper or similar material within the shoulder left between the body of the solder and the rim of the holder and pouring the melted paraffine therein and allowing it to cool, when the cover can be applied, as usual. When the splice is to be exposed, the insulating material can be removed with much more ease than if it had to be dug out from a cup-shaped holder.

The mode of uniting the cover and holder shown in Fig. 5 is preferable for simplicity and cheapness of construction, and because a tighter joint can be made than could be made by the use of bolts, unless so many are used as to increase materially the cost of construction.

The specific construction shown in Figs. 6 and 7 and the device for connecting electrically the ends of the conductors are not claimed herein, the same forming the subject-matter of a separate application.

I claim as my invention the following defined novel features, substantially as hereinbefore specified, namely:

1. The combination of a holder constructed to receive and hold electric conductors, a cover constructed to be applied to said holder, a fixed support, and a locking device to lock said cover to said support.

2. The combination of a holder constructed to receive and hold electric conductors, a cover constructed to be applied to said holder and having an eye formed thereon, a fixed support to which said eye may be secured, and a locking device to lock said eye to said support.

3. The combination of a holder recessed on its inner face and apertured to receive a conductor, a metal-covered conductor extended with its covering through the aperture, and solder within the recess and uniting said conductor firmly to said holder.

4. The combination of a flat disk-like holder apertured to receive the end of a conductor, a metal-covered conductor extended with its covering through the aperture, solder applied to the inner face of said holder and uniting the conductors firmly thereto, and a cover secured to said holder.

5. The combination of a holder apertured to receive the end of a conductor, and a cover constructed to be secured to said holder by a screw-coupling and provided with means to engage with a fixed support.

6. The combination of a disk-like holder constructed to receive and hold conductors and screw-threaded, and a cover constructed to be applied to said holder and screw-threaded to engage therewith, and provided with means to engage with a fixed support.

7. The combination of a holder apertured to receive the end of a conductor, a cover constructed to be secured to said holder by a screw-coupling and provided with means to engage with a fixed support, and a locking device to lock said cover to said support.

8. The combination of a disk-like holder constructed to receive and hold conductors and screw-threaded, a cover constructed to be applied to said holder and screw-threaded to engage therewith, a fixed support, and means to lock said cover to said support.

In witness whereof I have hereunto signed my name in the presence of two subscribing witnesses.

JOSEPH DILLON.

Witnesses:
 JNO. E. GAVIN,
 CHARLES K. FRASER.